United States Patent [19]
Burelle

[11] 4,267,863
[45] May 19, 1981

[54] TUBE REINFORCED WITH A SYNTHETIC MATERIAL

[75] Inventor: Jean Burelle, Courbevoie, France

[73] Assignee: Compagnie Plastic Omnium, Lyons, France

[21] Appl. No.: 632,704

[22] Filed: Nov. 17, 1975

[30] Foreign Application Priority Data

Nov. 19, 1974 [FR] France .................................. 74 38043

[51] Int. Cl.³ .......................... F16L 9/18; F16L 57/00
[52] U.S. Cl. .................................. 138/109; 138/110;
  138/140; 138/143; 138/144; 138/147; 138/172;
  138/174; 156/187; 156/257; 156/294; 285/114;
  264/139; 264/239
[58] Field of Search ............... 138/109, 110, 140, 142,
  138/143, 144, 147, 153, 172, 174; 156/257, 294;
  228/135, 178; 285/114; 264/139, 239

[56] References Cited

U.S. PATENT DOCUMENTS

| | | | |
|---|---|---|---|
| 1,201,608 | 7/1916 | Mosler et al. ........................ | 228/135 |
| 1,513,723 | 10/1924 | Bohlander ............................ | 138/147 |
| 1,823,566 | 9/1931 | Maranville ....................... | 156/257 X |
| 1,894,371 | 1/1933 | Fender ................................ | 138/147 |
| 2,613,343 | 10/1952 | McGee ........................... | 138/147 X |
| 2,630,301 | 3/1953 | Lentz ............................... | 138/172 X |
| 2,725,079 | 11/1955 | Streed et al. ..................... | 138/140 X |
| 2,907,103 | 10/1959 | Lewis et al. ................. | 138/DIG. 3 |
| 2,941,911 | 6/1960 | Kumnick et al. ............ | 138/DIG. 3 |
| 3,084,003 | 4/1963 | Matt et al. ...................... | 138/147 X |
| 3,290,772 | 12/1966 | Crouch .......................... | 228/178 X |
| 3,323,552 | 6/1967 | Whitehead ...................... | 138/174 X |
| 3,324,894 | 6/1967 | Deal .................................. | 138/109 |
| 3,360,010 | 12/1967 | Goto ................................. | 138/142 |
| 3,874,544 | 4/1975 | Harmon ......................... | 138/147 X |
| 3,891,006 | 6/1975 | Lee .................................. | 138/153 X |
| 3,921,673 | 11/1975 | Pepo .................................. | 138/109 |

FOREIGN PATENT DOCUMENTS 317223  11/1956  Switzerland ...................... 138/172

Primary Examiner—James E. Bryant, III
Attorney, Agent, or Firm—Brisebois & Kruger

[57] ABSTRACT

A tube made from a rigid material such as PTFE is surrounded by a rigid tubular sheath. The ends of the synthetic material tube are provided with collars which emerge from the rigid sheath, the sheath having on its inner face, adjacent to each collar, a locking member. The locking member forms a substantially annular relief and penetrates a correspondingly shaped groove on the outer surface of the tube of synthetic material.

10 Claims, 3 Drawing Figures

TUBE REINFORCED WITH A SYNTHETIC MATERIAL

The present invention relates to a tube reinforced with a synthetic material such as polytetrafluoroethylene (PTFE). More particularly the invention relates to a tube made from a material in which the reinforcement or sheath is obtained by a rigid e.g. metal tube surrounding the synthetic material tube. Such tubes have an interesting behaviour in the case of a pressure difference, particularly when the inside of the tube is placed under vacuum.

It is known that such tubes generally have at their ends collars made from synthetic material cooperating with flanges for joining two consecutive tubes, whereby the collars of the tubes applied against one another ensure the sealing thereof.

Experience has shown that when the individual tubes have a certain length the synthetic material expands axially when the temperature rises at one point, so that there is a considerable risk of breaks and leaks relative to the collars, which are themselves axially immobilized.

The invention proposes to obviate these disadvantages and to supply a tube reinforced with a synthetic material such as PTFE in which the danger of deterioration relative to the collars under the action of thermal expansion is eliminated.

The object of the invention is a tube made from synthetic material such as PTFE surrounded by a rigid tubular sheath, preferably of metal, whereby the ends of the synthetic material tube are provided with collars which emerge from the rigid sheath, wherein the said rigid sheath has on its inner face, adjacent to each collar, a locking member forming a substantially annular relief and penetrating a correspondingly shaped groove on the outer surface of the synthetic material tube.

According to a particularly simple preferred embodiment this annular member is constituted by a, for example, steel ring of preferably square or rectangular cross-section penetrating a tube of complimentary cross-section in the synthetic material tube.

The ring can be continuous or discontinuous. In the latter case it can comprise a certain number of spaced portions which either penetrate a continuous groove or the discontinuous spaces made in the annular zone of the synthetic material.

In the case of very long tubes, according to a development of the invention it is also possible to fit such substantially annular locking members in corresponding grooves in the central zone of the tube.

According to a preferred embodiment the tubular portion made from synthetic material is produced by winding a large number of layers of PTFE tape onto a mandrel in order to obtain a thick winding which is then subjected to curing so as to closely interlink the different turns with one another and form a homogeneous tubular body, onto which is subsequently shaped the collars, whereby the said groove which receives the substantially annular member is then machined in the outer surface of the thus obtained tubular PTFE portion.

According to a special embodiment the tubular PTFE portion can be obtained by winding a raw calendered PTFE tape onto a mandrel, said tape being about 5 to 20 hundredths of a mm thick, whereby 10 to 300 tape layers are wound, the thus wound tape then being raised to a temperature exceeding its gelling temperature and below 380° to 400° C. for a time which is sufficient to bring about PTFE gelling.

Preferably and particularly when the tubular PTFE-thickness at least equal to 5 mm the collars are obtained by reducing by machining the thickness of the ends to a sufficient length, then folding back these ends to form the collars, the groove obviously being made in a portion of the tube retaining its initial thickness.

However, as a variant it is possible to obtain the collars by winding a large number of tape layers, more particularly into a spiral. Moreover, in the case of thinner tubes a direct deformation of the collars is possible without prior thickness reduction by machining.

As a variant it is also possible to produce the tube by moulding or by granular extrusion, whereby the collars can either be moulded directly or folded back after producing the synthetic material tube and optional thickness reduction of the end by machining.

Other advantages and characteristics of the invention can be gathered from the following description with reference to non-limitative embodiments and the accompanying drawings, wherein show:

FIG. 1 an axial sectional view of the end of a tube after machining

FIG. 2 a view of a tube after machining

FIG. 3 a view of the finished tube wth the sheath.

Figure 1:
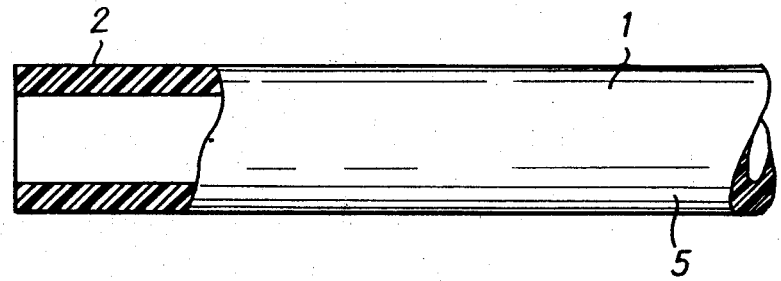
Figure 2:
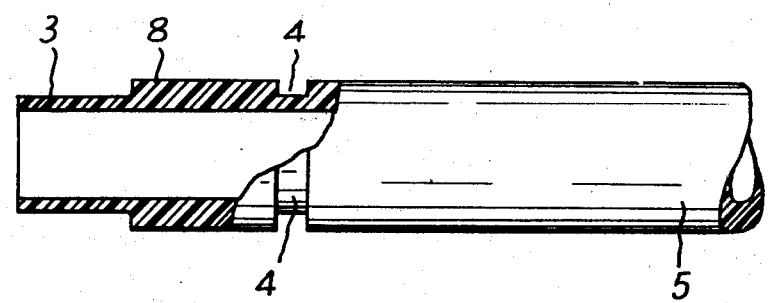
Figure 3:
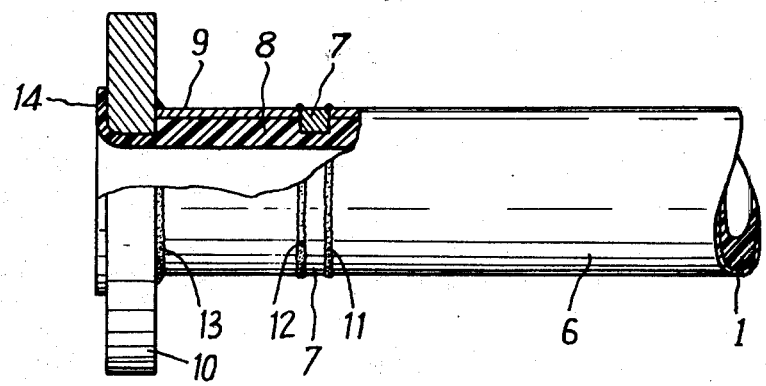

As an example a 2.50 m long PTFE tube by winding 130 layers of a 0.075 mm thick raw PTFE tube onto a mandrel the winding being performed with overlapping turns. Prior to winding the tube was calendered.

The thus obtained winding, 11 mm thick and with an internal diameter of 100 mm is then heated to 365° C. in an oven for 1½ hours.

After cooling and separation from the mandrel the thus formed tube 1 is cut at its ends to give a thinner end 3. A groove 4 of rectangular cross-section is produced by machining close to thinner end 3.

Onto the central portion 5 of synthetic material tube 1 is fitted a steel sheathed tube 6, whose end stops each time against the edge of groove 4. In groove 4 is fitted an annular member 7 of rectangular cross-section which can for example comprise two half-rings which are then welded to one another to form a complete ring. Onto the still thick end portion 8 is fitted a short tubular sheath 9 of the same diameter as tube 6, whilst onto the thinner portion 3 is fitted a metal flange 10. Annular member 7 is joined to tubes 6 and 9, positioned on either side by two weldkng seams 11, 12, whilst flange 10 is joined to tube 9 by another welding seam 13.

Finally by a per se known process that portion of thinner end 3 which projects in front of flange 10 is folded back against the flange to form a collar 14.

As a variant the tube 6 can be made from another rigid material, e.g. a polyester.

The thus produced reinforced tube has undergone a test consisting of a flow inside the tube of steam at 10 bars and a temperature of 180° C. for 15 minutes, then after stopping the steam a flow of cold water at 18° C. for 15 minutes, this succession of operations being repeated 200 times.

Despite the expansion caused by this test the tube gave complete satisfaction and no fractures or leaks were started either relative to the collar or anywhere else. It was found that the axial expansion of the tubular PTFE portion 1 was either not transmitted or only transmitted to a limited extent to the end portion 8 and to collars 14, due to the presence of member 7 cooperating with groove 4.

Figure 4:
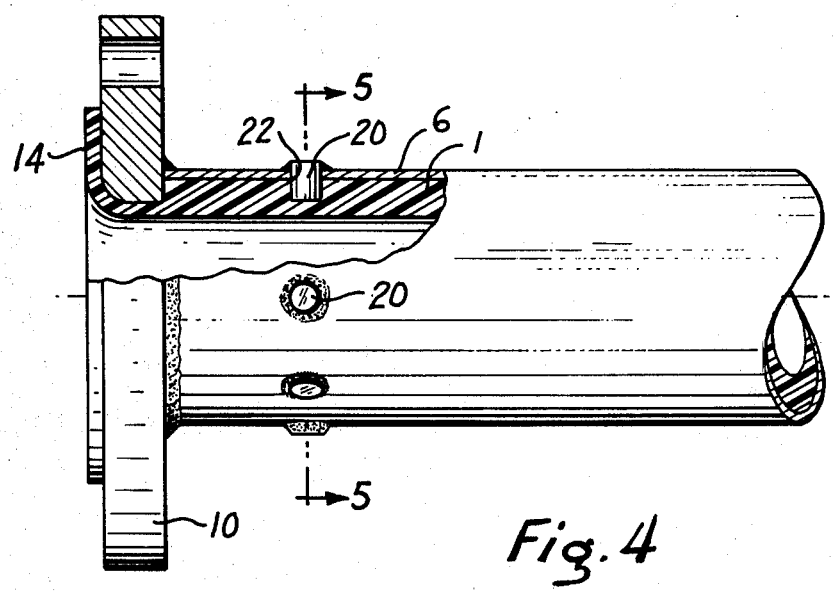
FIG. 4 is an axial section of another embodiment.
Figure 5:
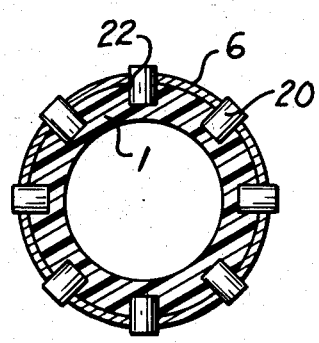
FIG. 5 is a view in section taken along line 5—5 of FIG. 4.
Figure 6:
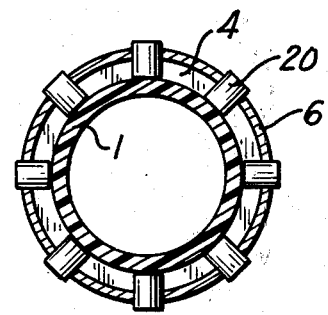
FIG. 6 is a view corresponding to FIG. 5 and showing a continuous groove in the tube.

As a variant instead of using a continuous ring, such as 7 it is also possible to use a discontinuous annular relief, comprising a succession of separated members or portions such as elements 20 in the form of pins or studs welded to steel tube 6 (FIGS. 4–6), there being more of the elements 20 when their dimensions decrease. These elements 20 preferably penetrate a discontinuous groove in layer 8, said groove being formed by a succession of orifices 22 arranged around layer 8. The said orifices 22 can be made in the synthetic material beforehand or they can be formed by radially embedding the elements into the synthetic material. FIG. 6 shows elements extending into a continuous groove 4 of the tube.

Although the invention has been described relative to a particular embodiment it is obviously not limited thereto and various modifications can be made thereto without passing beyond the spirit or scope of the invention.

I claim:

1. In a tube made from a synthetic plastic material surrounded by a continuous rigid tubular sheath, the ends of said tube of synthetic plastic material being formed with collars which project radially beyond said rigid sheath, the improvement which comprises means for preventing damage to said tube at said collars as a result of expansion and contraction of the tube with respect to said rigid sheath, said means comprising locking member fixed to said rigid sheath adjacent each collar and projecting radially inward from said sheath into a mating groove in the outer surface of said tube of synthetic plastic material.

2. A tube according to claim 1, wherein the said member comprises a ring having a square or rectangular cross-section which penetrates a groove of complimentary cross-section in the synthetic material tube.

3. A tube according to claim 1, wherein the said member comprises a pluarlity of separated discontinuous members.

4. A tube of considerable length according to claim 1 which also comprises at least one locking member cooperating with a groove and located in the central zone of the tube.

5. A tube according to claim 1 wherein the member comprises a ring on either side of which are welded portions of said rigid sheath.

6. A tube according to claim 1 in which said collar is thinner than the remainder of said synthetic plastic tube.

7. A tube according to claim 1 which is produced by winding a PTFE tape, followed by curing.

8. A tube according to claim 7, which is formed by winding a large number of layers of calendered crude PTFE tape, having then undergone curing beyond the gelling temperature, whereby the tape thickness is between 5 and 20 hundredths of a mm.

9. A tube according to claim 1 which is produced by moulding.

10. A tube according to claim 1 which is produced by granular extrusion.

* * * * *